United States Patent
Simmons et al.

(10) Patent No.: US 6,402,206 B1
(45) Date of Patent: Jun. 11, 2002

(54) FITTING FOR PLASTIC TUBING

(76) Inventors: John M. Simmons, 605 Slayton; Tom M. Simmons, 504 Slayton, both of Saginaw, MI (US) 48603

( * ) Notice: Subject to any disclaimer, the term of this patent is extended or adjusted under 35 U.S.C. 154(b) by 0 days.

(21) Appl. No.: 09/568,397

(22) Filed: May 10, 2000

(51) Int. Cl.$^7$ ................................................ F16L 39/00
(52) U.S. Cl. ...................... 285/321; 285/305; 285/921
(58) Field of Search ................................ 285/305, 321, 285/308, 921

(56) References Cited

U.S. PATENT DOCUMENTS

| | | | | |
|---|---|---|---|---|
| 3,922,011 A | * | 11/1975 | Walters | 285/321 X |
| 4,007,953 A | * | 2/1977 | Powell | 285/321 |
| 5,332,271 A | * | 7/1994 | Grant et al. | 285/334.5 |
| 5,472,244 A | | 12/1995 | Nishikata | 285/321 |
| 5,527,072 A | * | 6/1996 | Norkey | 285/921 X |

* cited by examiner

Primary Examiner—Lynne H. Browne
Assistant Examiner—John R. Cottingham
(74) Attorney, Agent, or Firm—Michael D. McCully

(57) ABSTRACT

A plastic fitting for plastic tubing is disclosed. The plastic fitting comprises a main body (10) having a tip sleeve (16) at one end of and an externally threaded portion (14) at the other end thereof, a cylindrical cap nut (20, 52, 64) threadedly attachable to the main body (10) in a manner to compress a flared end (36) of the plastic tubing down against the tip sleeve (16) of the main body, and a resiliently deformable split ring (30, 42, 60) that resides within an annular internal recess (28, 50, 72) in the cap nut (20, 52, 64) for retaining the flared end (36) of the plastic tubing in position around the main body tip sleeve (16). The resiliently deformable split ring (30, 42, 60) includes a plurality of inwardly facing bosses (38, 46) that cooperate with respective spaced apertures (40) formed in the plastic tubing flared end (36). These split ring bosses (38, 46) engage the tubing flared end to retain the tubing flared end within the cap nut and in functional position around the main body tip sleeve (16). In a first embodiment, the split ring (30) is simple in construction, having a rectangular cross-section, and is intended to reside within the internal annular recess (28) formed in the cap nut (20) in a manner that the bottom end of the cap nut annular recess (28) retains the split ring (30) in position within the cap nut (20), and the split ring inwardly facing bosses (38) retain the flared end (36) of the plastic tubing in position within the cap nut and positioned around the main body tip sleeve (16). In a second embodiment, cam lobes (44) formed on the split ring (42) cam the split ring bosses (46) down into the plastic tubing flared end spaced apertures (40). A third embodiment plastic tubing fitting incorporates the split ring cam lobes (62) and cap nut annular internal recess angular side walls (74, 76) that compress the split ring (60) down upon the plastic tubing flared end.

12 Claims, 15 Drawing Sheets

FITTING FOR PLASTIC TUBING

BACKGROUND OF THE INVENTION

1. Field of the Invention

The present invention relates to a plastic fitting for plastic fluid tubing, and more particularly relates to a plastic fitting for plastic tubing having an internal split ring that grips onto the plastic tubing to prevent the plastic tubing from separating from the fitting.

2. Description of the Prior Art

Fluid fittings for plastic tubing are well known in the art. Additionally, plastic tubing fittings and plastic tubing are required in certain environments (for instance, semiconductor manufacturing), wherein all fluid-handling components used in the manufacture of semi-conductors must be non-metallic, in order that the fluid-handling components would not react with semi-conductor manufacturing chemicals (e.g., various acids), resulting in deterioration of the fluid-handling components by the manufacturing chemicals.

U.S. Pat. No. 5,472,244 discloses various attempts to design plastic couplings for plastic tubing. Specifically, this patent teaches a concept of introducing a split ring into an internal annular recess formed in the cap nut. The split ring is designed to "bite" into a corresponding annular groove formed in the plastic tubing as the cap nut is screwed onto the main body of the coupling, in order to retain the plastic tubing in position on the plastic tubing coupling. Inasmuch as the split ring essentially totally circumscribes the plastic tubing, and specifically the annular groove in the plastic tubing, the sharp "biting" edge of the split ring bites into the already weakened plastic tubing at the annular groove therein, further weakening the structural integrity of the plastic tubing as the cap nut and split ring are further tightened down upon the plastic tubing. This "biting" of the sharp edge of the split ring into the plastic tubing can eventually cut through the plastic tubing, leaving nothing to retain the plastic tubing in fluid communication with the plastic coupling. This, of course, results in a leaking fluid connection and disengagement of the plastic tubing from the plastic coupling if the semi-conductor manufacturing chemical is under sufficient pressure.

OBJECTS OF THE INVENTION

It is therefore an object of the present invention to provide a plastic fluid fitting for plastic tubing that overcomes the problems inherent in prior plastic tubing fittings.

It is a further object of the present invention to provide a plastic tubing fitting of the type incorporating a split ring mechanism that grips onto the plastic tubing that retains the plastic tubing in functional position without cutting into the plastic tubing.

It is a still further object of the present invention to provide such a plastic tubing fitting that utilizes standard fluid fitting sizes in order to be utilized with standard flared tubing fittings.

It is a still further object of the present invention to provide such a plastic tubing fitting wherein radially inward force upon the plastic tubing to compress the tubing against a standard flared fitting is provided by a unique camming mechanism formed in the split ring and cap nut.

SUMMARY OF THE INVENTION

The present invention provides a plastic fitting for plastic tubing having a flared end (36). The plastic fitting comprises a main body (10) having a tip sleeve (16) at one end thereof and an externally threaded portion (14) at the other end thereof, a cylindrical cap nut (20, 52, 64) threadedly attachable to the main body (10) in a manner to compress the plastic tubing down against the tip sleeve (16) of the main body, and a resiliently deformable split ring (30, 42, 60) that resides within an annular internal recess (28, 50, 72) in the cap nut (20, 52, 64) for retaining the flared end (36) of the plastic tubing in position around the main body tip sleeve (16). The resiliently deformable split ring (30, 42, 60) includes a plurality of inwardly facing bosses (38, 46) that cooperate with respective spaced apertures (40) formed in the plastic tubing flared end (36). These split ring bosses (38, 46) engage the tubing flared end to retain the tubing flared end within the cap nut and in functional position around the main body tip sleeve (16).

In a first embodiment, the split ring (30) is simple in construction, having a rectangular cross-section, and is intended to reside within the internal annular recess (28) formed in the cap nut (20) in a manner that the bottom end of the cap nut annular recess (28) retains the split ring (30) in position within the cap nut (20), and the split ring inwardly facing bosses (38) retain the flared end (36) of the plastic tubing in position within the cap nut and positioned around the main body tip sleeve (16).

In a second embodiment, the split ring (42) is formed with a plurality of cam lobes (44) on the outer circumference thereof. These cam lobes (44) are designed to nest within respective detents (48) formed within the annular internal recess (50) formed in the cap nut (52). Alignment of the respective split ring cam lobes (44) and cap nut annular recess detents (48) permits the split ring (42) to be expanded slightly in order to be able to be positioned around the plastic tubing flared end (36) when the flared end is in position on the main body tip sleeve (16). Threadedly attaching the cap nut (64) to the plastic fitting main body (10) allows the respective split ring bosses (46) to engage respective spaced apertures (40) formed in the plastic tubing flared end, thereby permitting the split ring (42) to draw itself down around the plastic tubing flared end. This releases the cam lobes (44) from respective cap nut internal annular recessed detents (48), so that further rotation of the cap nut (64) onto the plastic fitting main body (10) causes the cap nut internal annular recess (50) to cam the respective cam lobes (44) toward the plastic tubing flared end in order to further tightly compress the split ring (42) down against the plastic tubing flared end and lock the split ring bosses (46) within the plastic tubing flared end spaced apertures (40) to retain the plastic tubing in position.

A third embodiment of the plastic fitting of the present invention incorporates the split ring cam lobes (62) and cap nut annular internal recess detents (82), and also incorporates angled annular front and rear surfaces (78, 80) of the split ring (60) and mating angular annular side walls (74, 76) of the recess (72) in the cap nut (64) in a design that enhances the ability of the cap nut (64) to compress the split ring (60) down upon the plastic tubing flared end, and also provides a mechanism for releasing the split ring (60) from the plastic tubing flared end as the cap nut is removed from the main body tip sleeve.

DETAILED DESCRIPTION OF THE EMBODIMENTS

Figure 1:
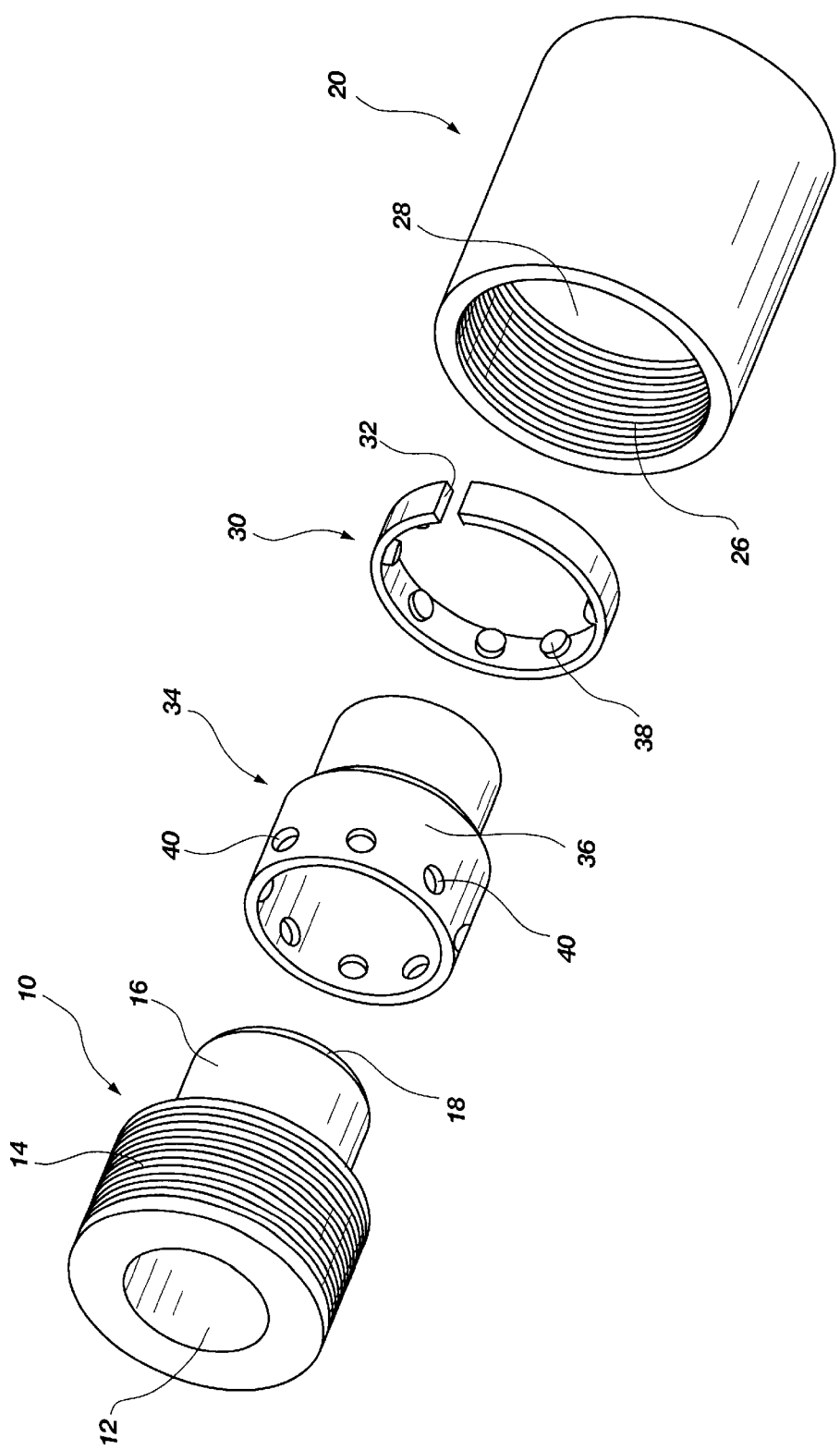
FIG. 1 is an exploded perspective view of a first embodiment of the plastic tubing fitting of the present invention, comprising the cap nut, split ring, flared end of the tubing, and the tip sleeve of the tubing fitting.

Turning now to the drawings, and initially to FIG. 1, a first embodiment of the plastic tubing fitting of the present invention is shown in exploded perspective view. The fitting comprises a main body 10 having a central fluid passageway 12 defined by a larger diameter externally threaded section 14 and a smaller diameter tip sleeve 16 having a circumferential bevel 18 at the right end thereof.

Figure 2:
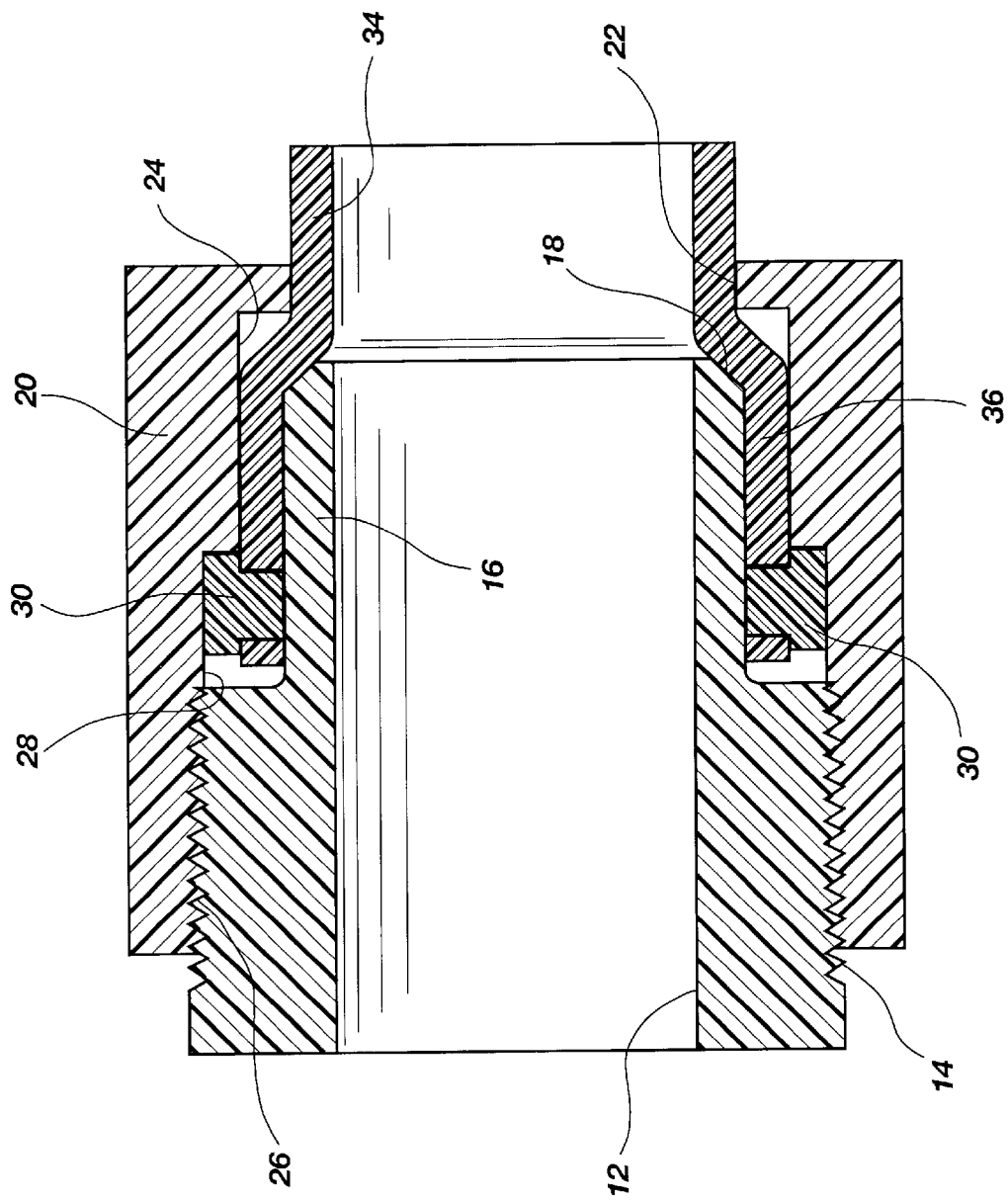
FIG. 2 is a longitudinal sectional view of the first embodiment plastic tubing fitting shown in FIG. 1, shown assembled together.

The plastic tubing fitting of the present invention also comprises a cap nut 20, the details of which are more clearly shown in FIG. 2. The cap nut includes a first bore 22 at a first end thereof (the right end), a second bore 24 adjacent the first bore, and an internally threaded third bore 26 at the end opposite the first bore. As shown, these bores are of gradually increasing diameters, the third bore being larger than the second bore, and the second bore being larger than the first bore. The cap nut 20 also includes a fourth bore intermediate the second bore 24 and threaded third bore 26, the fourth bore defining an internal annular recess 28, the purpose of which will be described in greater detail hereinbelow.

A primary objective and design of the plastic tubing fitting is that it be useable with standard size tubing fittings. Specifically, the cap nut 20 is designed to threadedly engage standard size flared tubing fittings having main bodies essentially identical to the main fitting body 10, in order that the plastic tubing fitting of the present invention be interchangeable with all standard size and thread comparable tubing fittings.

Returning to FIG. 1, the plastic tubing fitting also includes a split ring 30 comprising an annular ring having a split 32 therein. The split ring 30 is designed to fit inside the cap nut internal annular recess 28 and retain the end of a plastic tubing 34 in fluid-sealing engagement on the main body smaller diameter tip sleeve 16. To this end, the thickness of the split ring 30 is dimensioned to cause the split ring to be compressed down upon a flared end 36 of the plastic tubing as the split ring is fitted into the cap nut internal annular recess 28.

The split ring 30 includes a plurality of inwardly facing bosses 38 designed to engage respective spaced apertures 40 in the plastic tubing flared end 36. The bosses serve to lock the plastic tubing flared end around the main body tip sleeve 16. More specifically, the split ring bosses 38 serve to prevent the plastic tubing from being withdrawn from the cap nut 20, inasmuch as the split ring 30 is tightly fitted within the cap nut internal annular recess 28 when the cap nut is threaded onto the plastic tubing fitting main body 10, with the split ring bosses 38 fitting into respective tubing flared end spaced apertures 40. The split ring bosses have generally flat ends, and the bosses' height is, understandably, no greater than the thickness of the tubing flared end, and preferably, is slightly less than the thickness of the tubing flared end, so that the bosses do not prevent the split ring from being tightly compressed down around and against the tubing flared end.

As shown in FIG. 2, the split ring 30 incorporates a generally rectangular cross-section, except in the areas of the bosses 38. Such a design facilitates the use of a simple counterbore of constant diameter as the internal annular recess 28 formed in the cap nut 20.

The various components of the plastic tubing fitting of the present invention may be molded of a synthetic resin such as PTFE (polytetrafluoroethylene), PFA (perfluoroalkoxy), polyetheline, or essentially any plastic material.

Operation of First Embodiment

The procedure for utilizing the first embodiment plastic tubing fitting of the present invention is as follows: Typically, the flared end 36 of the plastic tubing is fitted on the smaller diameter tip sleeve 16 of the fitting main body 10, followed by slipping the split ring 30 up and over the plastic tubing flared end 36 and aligning the plurality of split ring bosses 38 into respective spaced apertures 40 in the plastic tubing flared end. In this regard, the split ring is resilient and is formed to have its "relaxed state" inner diameter slightly less than the outer diameter of the plastic tubing flared end, so that the split ring bosses will "snap" down into respective tubing flared end spaced apertures upon alignment.

With the plastic tubing thus fitted on the fitting main body tip sleeve and the split ring in place, the cap nut is then positioned around the split ring and the plastic tubing flared end, and threaded onto the main body larger diameter externally threaded section 14. Tightening the cap nut further on the main body draws the split ring 30, and therefore the plastic tubing 34, further up on the main body tip sleeve 16 until the plastic tubing engages the circumferential bevel 18 on the main body smaller diameter tip sleeve 16, and the cap nut first bore 22 engages the plastic tubing at the flare transition to the flared end.

Removal of the plastic tubing 34 from the plastic tubing fitting is essentially the reverse procedure. Specifically, the cap nut is removed from the main body 10, thereby exposing the split ring 30 and plastic tubing flared end 36. With the cap nut removed, the split ring 30 can be easily removed from the plastic tubing flared end 36, and the plastic tubing removed from the main body tip sleeve 16. Alternatively, with no compressive forces acting on the tubing flared end or split ring, the plastic tubing can be removed from the main body tip sleeve with the split ring in place.

Those skilled in the art will readily appreciate that the split ring bosses 38 function to retain the plastic tubing flared end 36 on the main body tip sleeve 16, and that the cap nut 20 prevents the split ring, and therefore the plastic tubing flared end 36, from separating from the main body tip sleeve or otherwise being withdrawn from the cap nut until it is desired.

The split ring 30 has been described and illustrated as having an essentially rectangular cross-section (except in the area of the split ring bosses). Likewise, the cap nut internal annular recess 28 is a standard counterbore of constant diameter. Those skilled in the art will readily appreciate that at least the outer circumferential surface of the split ring 30 may be tapered slightly to mate with a slightly tapered cap nut internal annular recess 28 that combine to have the effect of compressing the split ring down upon the plastic tubing flared end 36 even tighter as the cap nut is further threaded onto the main body larger diameter externally threaded section 14. In this manner, the fluid-seal between the main body tip sleeve 16 and plastic tubing flared end 36 is greatly enhanced.

Second Embodiment

Figure 3:
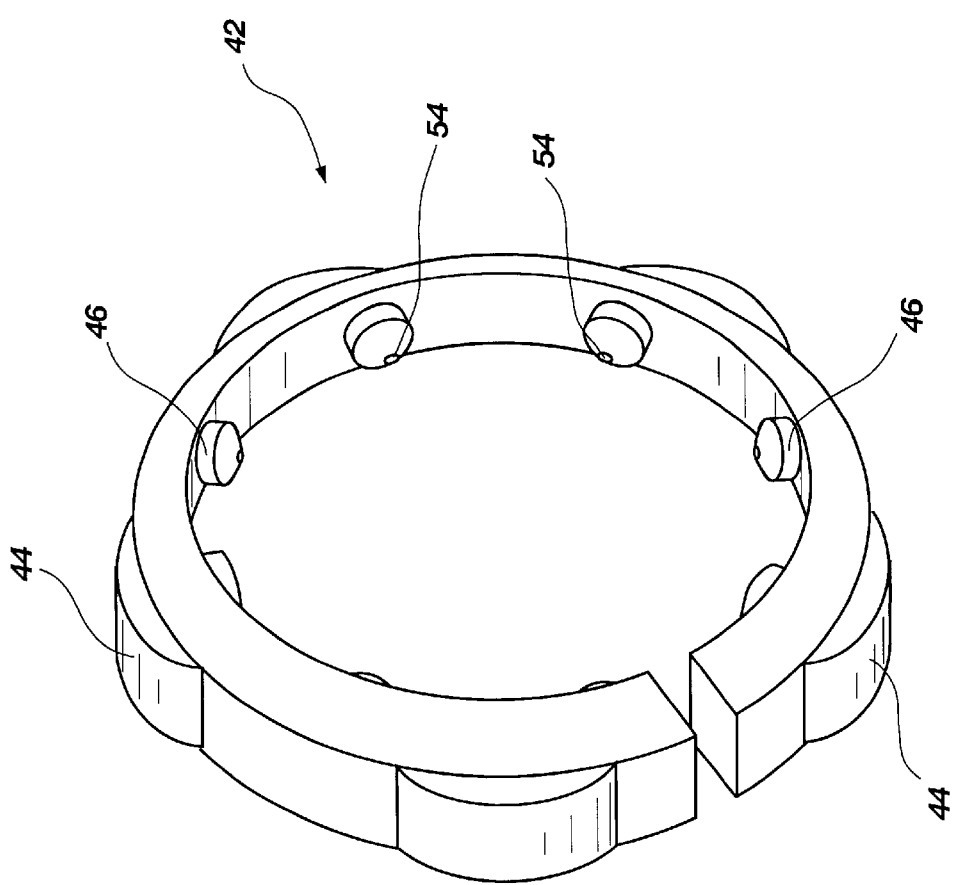
FIG. 3 is a perspective view of the split ring of a second embodiment of the plastic tubing fitting of the present invention.

FIG. 3 is a perspective view of the split ring 42 of a second embodiment plastic tubing fitting of the present invention. As shown, this second embodiment split ring 42 is essentially identical to the first embodiment split ring 30, except for the inclusion of a plurality of cam lobes 44 formed on the outer cylindrical surface of the split ring, and except for the configuration of the split ring bosses 46. The cam lobes 44 cooperate with mating detents 48 (best shown in FIG. 5) formed in the internal annular recess 50 of the cap nut 52 The design and operation of these split ring cam lobes 44 and cap nut internal annular recess detents 48 are more clearly shown in FIGS. 4 and 5, which are transverse sections of the second embodiment cap nut, split ring, plastic tubing flared end, and main body tip sleeve. In addition, the second embodiment split ring bosses 46 include respective conical-shaped ends 54 that function to self-align the bosses with respective plastic tubing flared end spaced apertures 40, as will be described in greater detail hereinbelow in the Operation of the Second Embodiment. These split ring boss conical-shaped ends 54 also function to assist the split ring to ride up onto the plastic tubing flared end 36 as the cap nut is screwed onto the fitting main body, as will be described hereinbelow.

Figure 4:
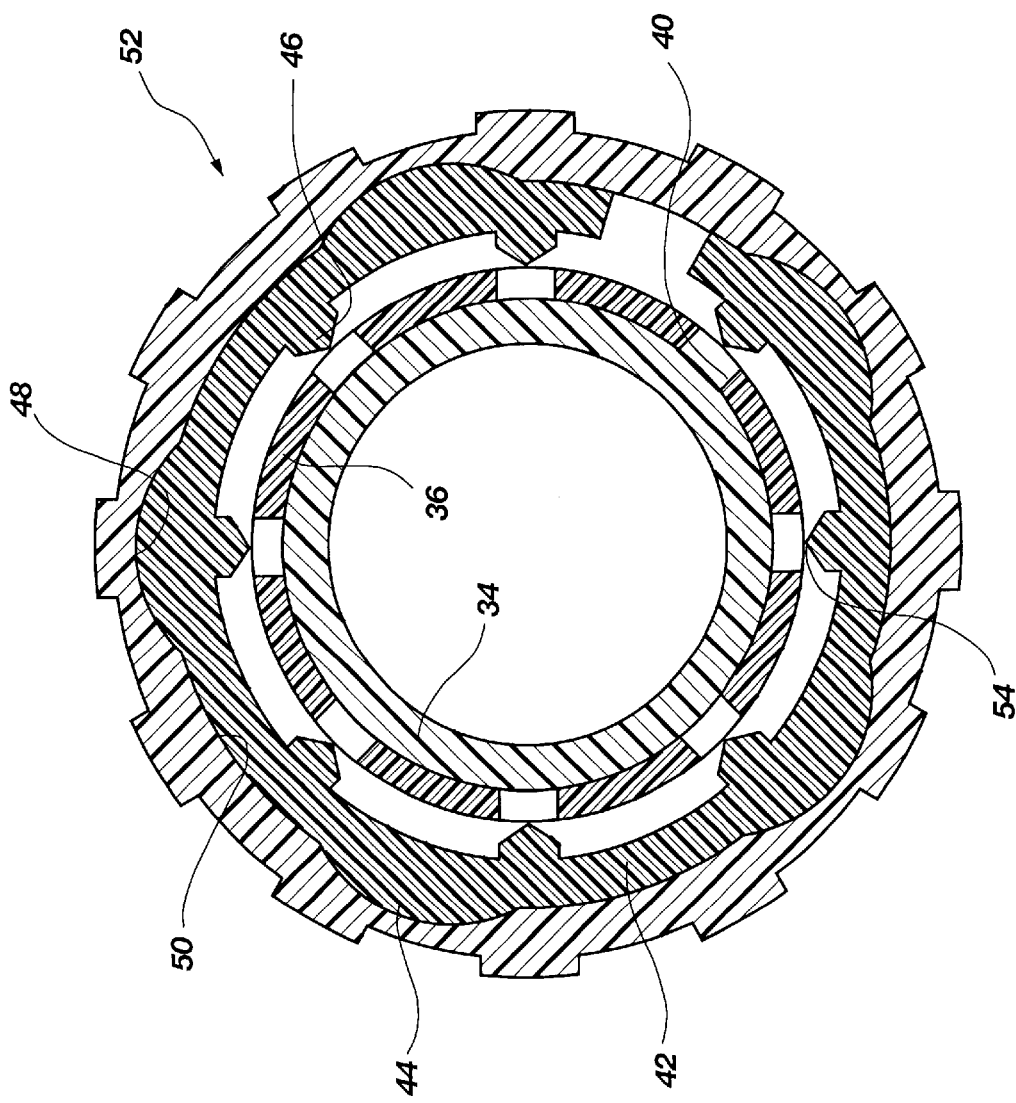
FIG. 4 is a transverse sectional view through the second embodiment split ring shown in FIG. 3, the second embodiment cap nut for use therewith, the plastic tubing flared end as shown in FIG. 1, and the plastic fitting tip sleeve shown in FIG. 1, illustrating the initial position in which the split ring is fitted into the cap nut, and the cap nut is positioned around the tubing flared end.

FIG. 4 illustrates the initial position in which the split ring 42 is fitted into the cap nut internal annular recess 50 prior to positioning around the tubing flared end. As shown, the split ring 42 is expanded such that the cam lobes 44 nest within respective cap nut detents 48 in a manner to maximize the inside diameter of the split ring in order to permit the split ring to easily slip over the plastic tubing flared end 36. The second embodiment split ring 42 is formed to have its "relaxed state" outer diameter slightly less than the inner diameter of the cap nut internal annular recess 50, so that the split ring will be self-retained in the cap nut internal annular recess as the cap nut is positioned over the tubing flared end and main body tip sleeve. As shown in FIG. 4, in its relaxed state, the split ring is sufficiently expanded so that the split ring bosses do not interfere with the outer cylindrical surface of the tubing flared end as the cap nut, with split ring fitted inside, is screwed onto the fitting main body. Rather, the split ring expands slightly as the split ring bosses (specifically, the conical-shaped ends 54) ride up onto the outer cylindrical surface of the tubing flared end, then contracts to its relaxed state as the split ring bosses align with and slip into respective tubing flared end spaced apertures.

Figure 5:
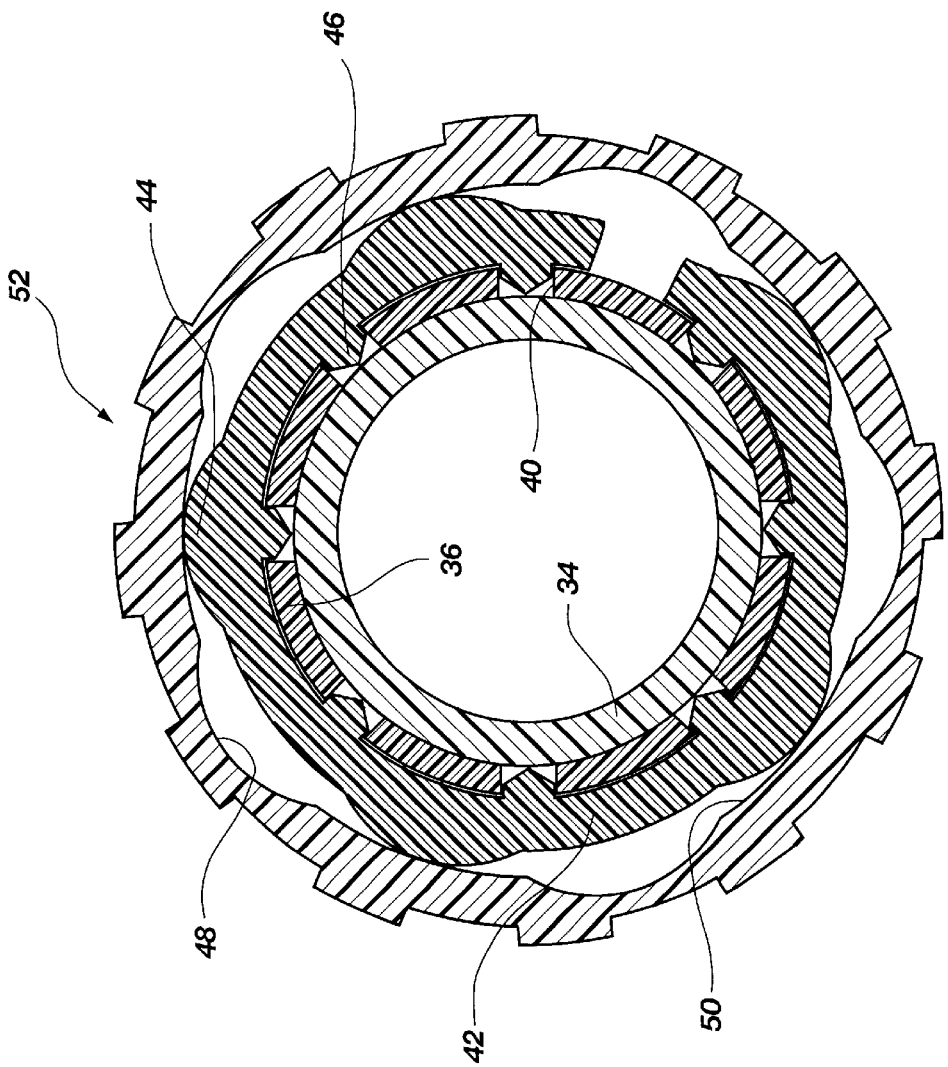
FIG. 5 is transverse sectional view similar to FIG. 4, illustrating the camming action of the split ring cam lobes, the cap nut having been rotated approximating 36 degrees relative to the split ring in order to "cam" the split ring bosses down into respective apertures in the tubing flared end.

FIG. 5 is similar to FIG. 4, but shows the cap nut 52 having been rotated approximately 36 degrees (in either direction) relative to the split ring 42 in order to "cam" the split ring down against the plastic tubing flared end 36, and specifically, to cause the split ring bosses 46 to be inserted into respective spaced apertures 40 in the plastic tubing flared end. This is accomplished by rotating the cap nut 52 relative to the split ring 42 in order to cause the internal cylindrical surface of the cap nut internal annular recess 50 to cam the split ring cam lobes 44 from their respective detents 48 to adjacent inside diameter surfaces of the cap nut internal annular recess 50.

Operation of Second Embodiment

Figure 6:
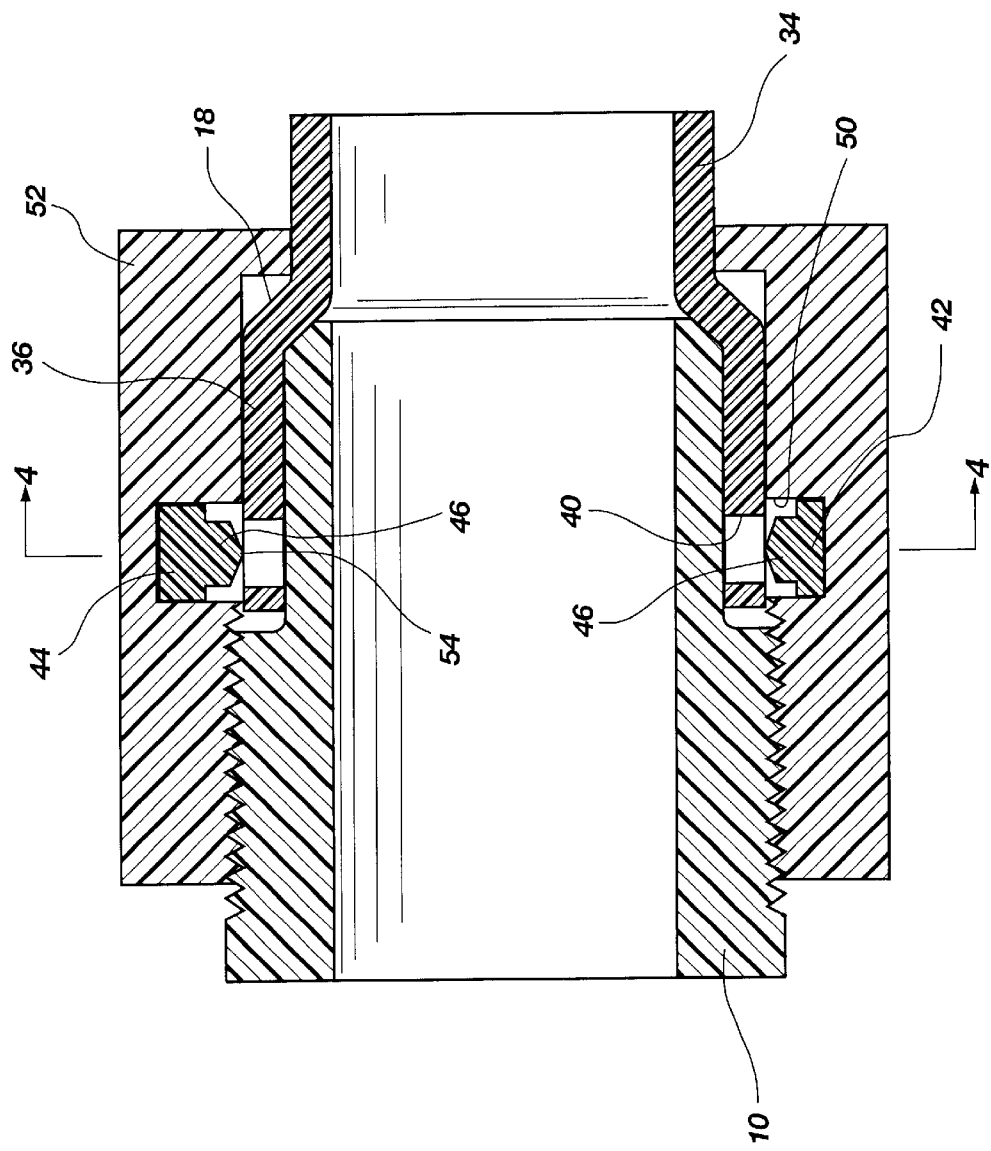
FIG. 6 is a longitudinal sectional view through the assembled second embodiment cap nut, split ring, tubing flared end, and fitting tip sleeve, illustrating the second embodiment cap nut and spit ring in its "relaxed state", as illustrated in FIG. 4.
Figure 7:
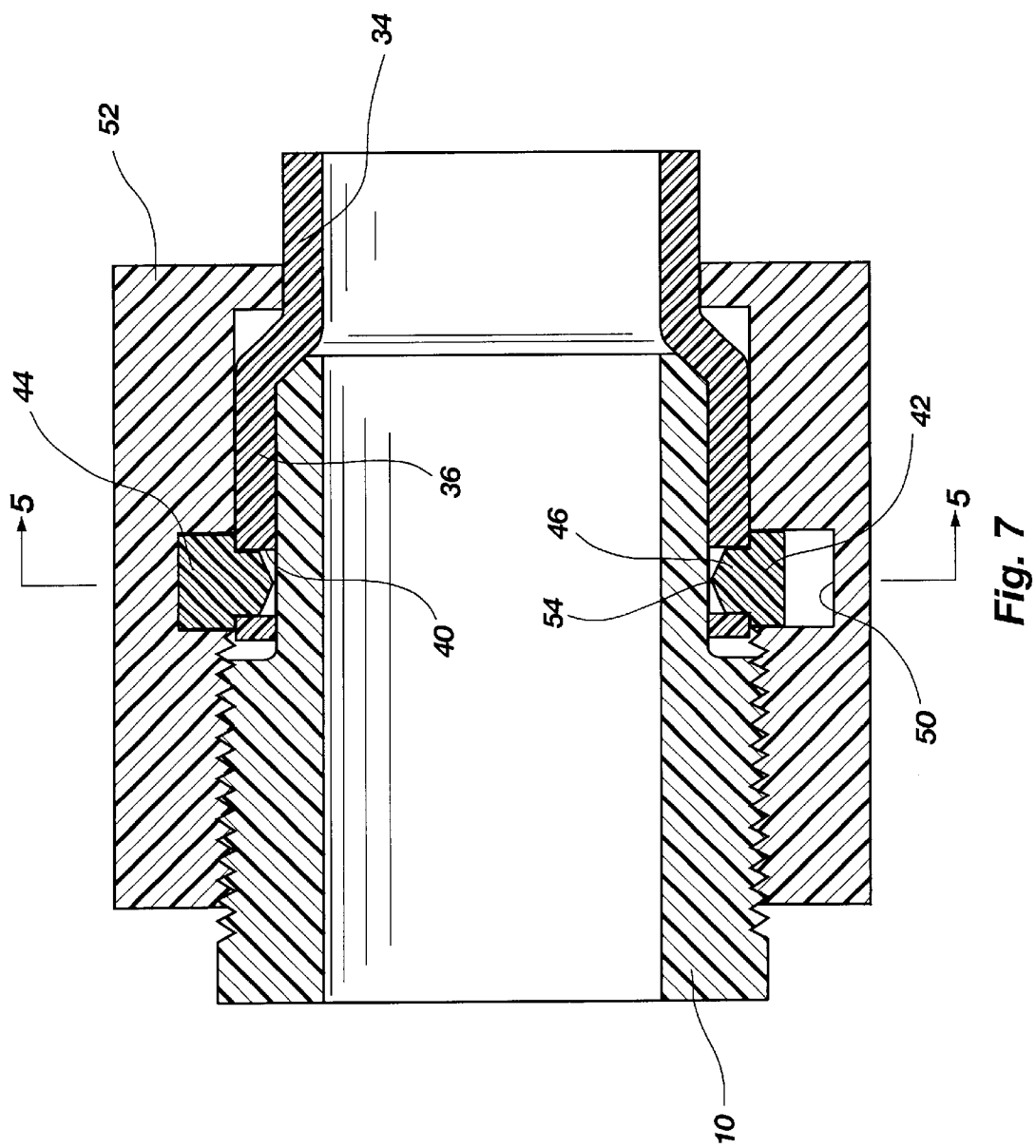
FIG. 7 is a longitudinal sectional view similar to FIG. 6 through the assembled second embodiment cap nut, split ring, tubing flared end, and fitting tip sleeve, illustrating the second embodiment split ring being "cammed" down into functional position against the tubing flared end section, as shown in FIG. 5.

The second embodiment is illustrated in FIGS. 3–7. The fitting is assembled by initially positioning the split ring 42 inside the internal annular recess 50 formed in the cap nut 52 such that the split ring cam lobes 44 nest into respective cap nut detents 48 as shown in FIGS. 4 and 6. With the split ring 42 so positioned, the cap nut can then be slipped up and over the plastic tubing flared end 36. Note that the plastic tubing flared end 36 may or may not be previously positioned on the fitting main body tip sleeve 16, although it is preferable that the plastic tubing flared end be in position on the main body tip sleeve prior to positioning the cap nut up over the plastic tubing flared end.

Threading the cap nut onto the main body larger diameter external threaded section has a dual effect, in addition to, of course, tightening the cap nut onto the main body threaded section. Specifically, as the cap nut 52 is threaded onto the main body threaded section 14, the split ring 42 is rotated around the plastic tubing flared end until the split ring bosses 46 locate and align themselves with respective plastic tubing flared end spaced apertures 40, at which time the inherent resiliency in the split ring causes the respective split ring bosses to slip down into respective plastic tubing flared end spaced apertures, thereby slightly reducing the outside diameter of the split ring. In this regard, the split ring boss conical-shaped ends 54 more effectively locate the plastic tubing flared end spaced apertures for ready alignment and mating.

With the split ring bosses 46 aligned with respective plastic tubing flared end spaced apertures 40, the split ring contracts slightly, causing the split ring cam lobes 44 to separate slightly from respective cap nut annular recess detents 48, and causing the split ring bosses to slip into respective plastic tubing flared end spaced apertures. With the cam lobes slightly separated from the detents, further rotation of the cap nut causes the cap nut internal annular recess 50 to cam the split ring cam lobes 44 toward the tubing flared end, with the result that the split ring is urged (cammed) down against the plastic tubing flared end 36 to urge the split ring bosses 46 into engagement with the plastic tubing flared end spaced apertures. With the split ring bosses fitted into respective plastic tubing flared end apertures, rotation of the split ring relative to the plastic tubing flared end is prevented, thereby forcing the camming action between the cap nut internal annular recess 50 and the split ring cam lobes 44, to compress the split ring down against the plastic tubing flared end.

Further rotation of the cap nut up onto the fitting main body, of course, draws the plastic tubing flared end up into sealing engagement with the tip sleeve and the tip sleeve circumferential bevel 18, and also draws the cap nut first bore 22 into engagement with the plastic tubing at the flare transition to the flared end in a manner to effect the fluid seal there between. This drawing up of the plastic tubing flared end upon the main body tip sleeve is, of course, effected because of the fact that the split ring 42 resides in the cap nut annular recess 50 and is prevented from axial translation within the cap nut. In this manner, the split ring bosses 46 prevent the plastic tubing from being pulled from the main body tip sleeve and cap nut.

Third Embodiment

Figure 8:
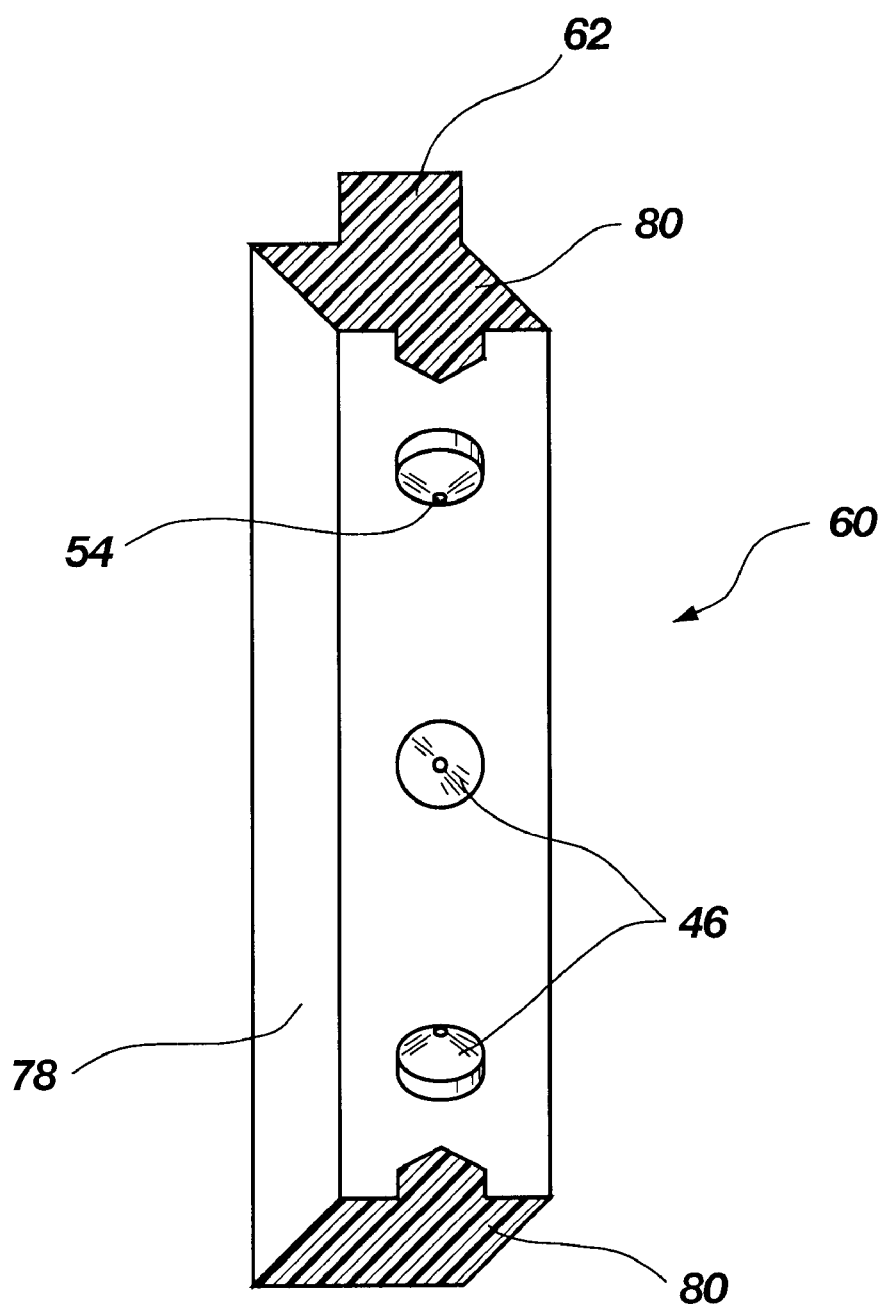
FIG. 8 is a longitudinal sectional view through a third embodiment split ring for use with a third embodiment plastic tubing fitting as illustrated in FIGS. 9–15.

FIGS. 8–15 illustrate a third embodiment of the plastic tubing fitting of the present invention. FIG. 8 is a sectional view through the third embodiment split ring 60. As shown, the cross section of this split ring forms a parallelogram as opposed to a rectangle, for purposes to be explained hereinbelow. Aside from that difference, the third embodiment split ring 60 is essentially identical to the second embodiment split ring 42, incorporating the plurality of split ring bosses 46 and cam lobes 62.

Figure 9:
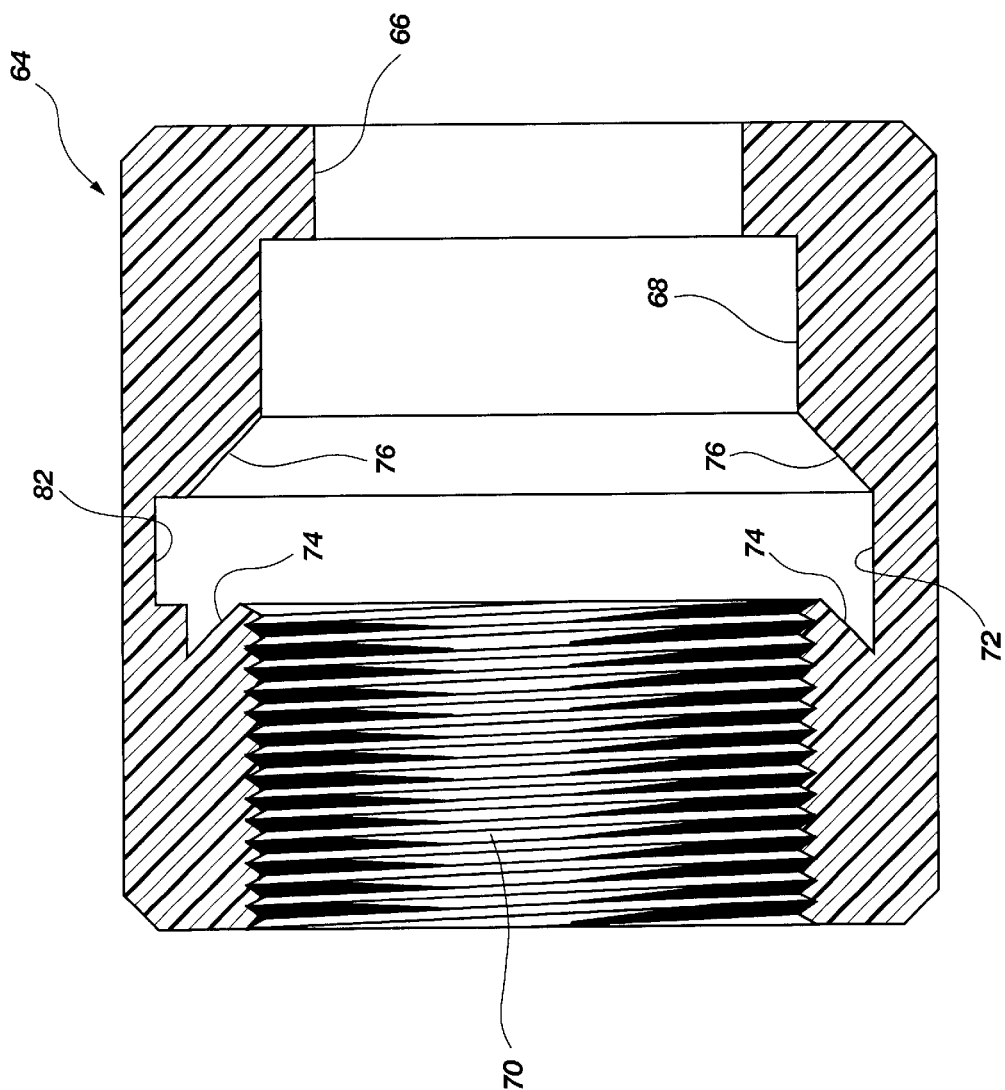
FIG. 9 is a longitudinal sectional view through a third embodiment cap nut of the present invention.

The split ring 60 is designed to fit inside the third embodiment cap nut 64, shown in longitudinal sectional view in FIG. 9. The third embodiment cap nut 64 is similar to the second embodiment cap nut 52, and therefore includes the first bore 66, the second bore 68, the internally threaded third bore 70, and the internal annular recess 72 in which resides the split ring 60. The difference between the third embodiment cap nut 64 and the second embodiment cap nut 52 (best illustrated in FIGS. 6 and 7) is that the third embodiment cap nut internal annular recess 72 is formed with angled annular first and second (front and rear) side walls 74, 76 that are adapted to engage respective first and second angled annular side surfaces 78 and 80 of the split ring 60 for purposes to be described hereinbelow.

Figure 10:
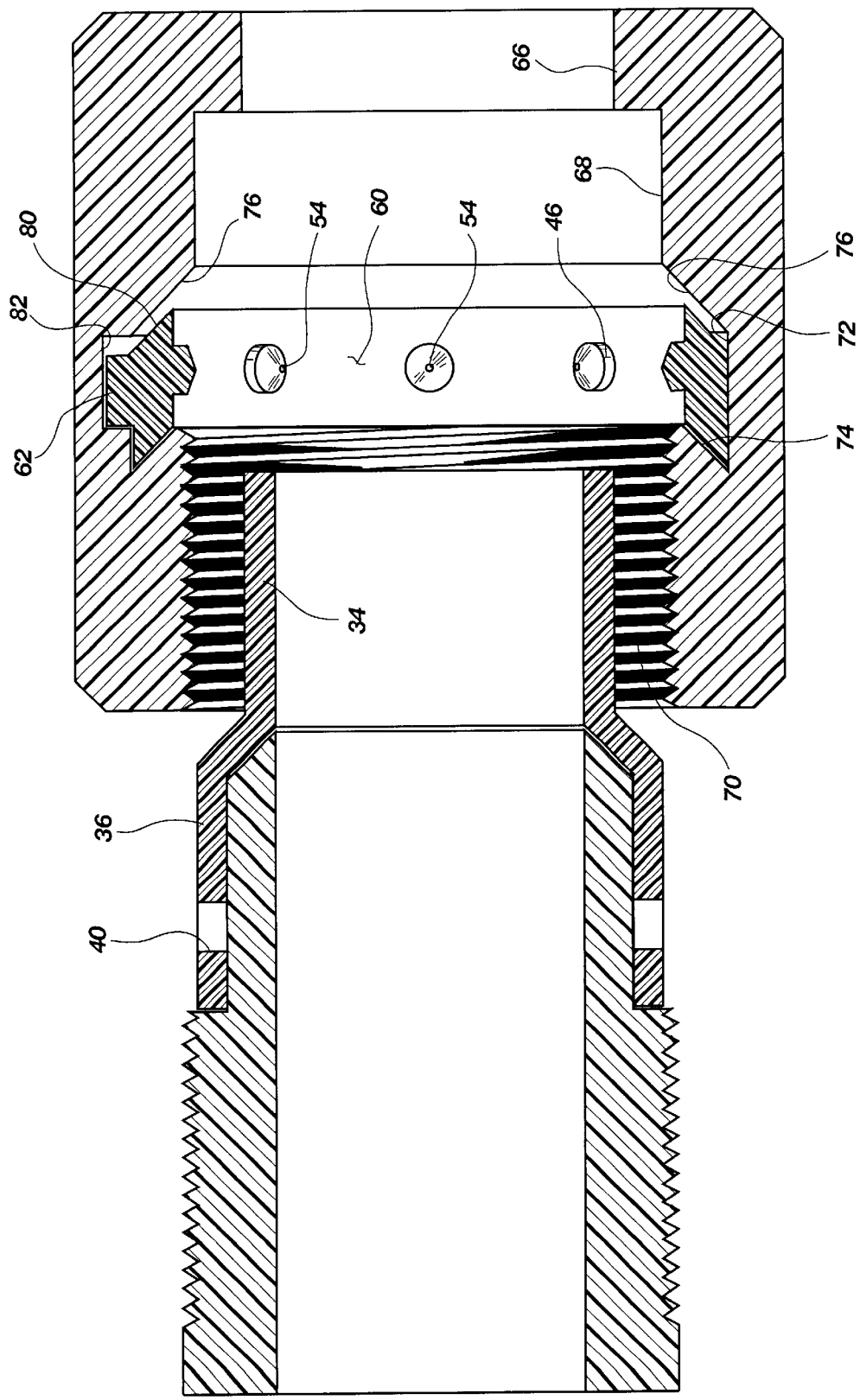
FIG. 10 is a longitudinal sectional view through a third embodiment plastic tubing fitting, illustrating the relative positions of the components prior to threading the cap nut onto the fitting main body.
Figure 11:
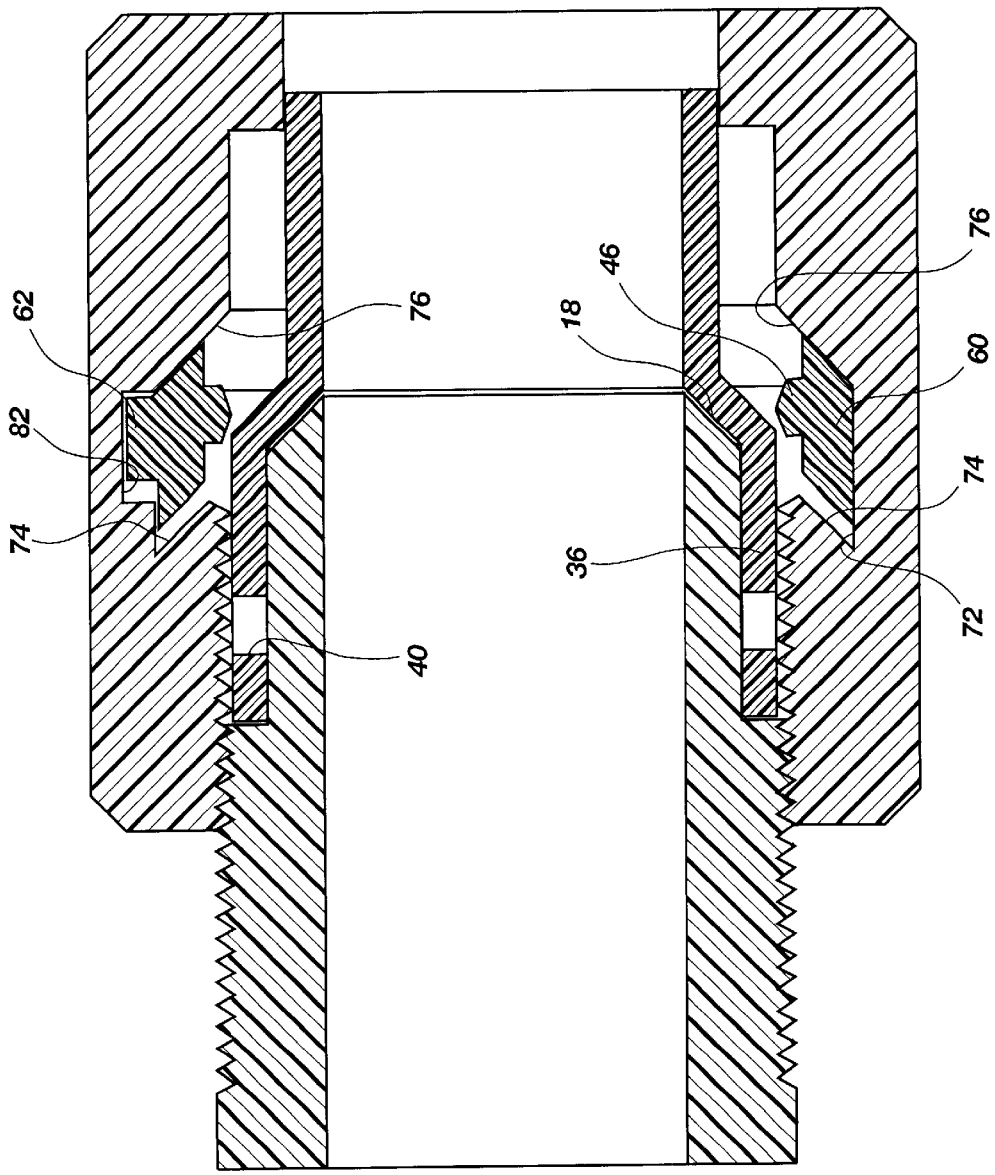
FIG. 11 is a longitudinal sectional view similar to FIG. 10 through the third embodiment plastic tubing fitting, illustrating the positioning of the plastic tubing fitting components as the cap nut is initially threaded onto the plastic tubing fitting main body, the split ring riding up onto the plastic tubing flared end.

FIG. 10 is a longitudinal sectional view through the third embodiment plastic tubing fitting, illustrating the relative positions of the components prior to threading the cap nut onto the fitting main body. In this third embodiment, the main body 10 and plastic tubing 34 are identical to those of the previous embodiments, the plastic tubing flared end 36 also including the spaced apertures 40. The split ring 60 of the third embodiment plastic tubing fitting of FIGS. 8–15, like the second embodiment split ring 42, resides in the cap nut internal annular recess 72. As shown, the split ring 60 is expanded such that the cam lobes 62 nest within respective cap nut detents 82 so that the split ring can easily slip over the plastic tubing flared end 36. The third embodiment split ring 60 is formed to have its relaxed state outer diameter slightly less than the inner diameter of the cap nut internal annular recess 72, so that the split ring will be self-retained in the cap nut internal annular recess as the cap nut is positioned over the tubing flared end and main body tip sleeve. As shown in FIG. 10, in its relaxed state, the split ring is sufficiently expanded so that the split ring bosses do not interfere with the outer cylindrical surface of the tubing flared end as the cap nut, with split ring fitted inside, is screwed onto the fitting main body. Rather, the split ring expands slightly as the split ring bosses 46 ride up onto the outer cylindrical surface of the tubing flared end, then contracts to its relaxed state as the split ring bosses align with and slip into respective tubing flared end spaced apertures. This is shown in FIG. 11.

Operation of Third Embodiment

The operation of the third embodiment plastic tubing fitting is illustrated in sequential steps in FIGS. 10–15, which are all longitudinal sectional views through the plastic tubing fitting in its various stages of assembly and disassembly. FIG. 10 is the first in this sequence, and illustrates the relative positions of the fitting components prior to threading the cap nut onto the fitting main body. It illustrates the split ring 60 in its relaxed position within the cap nut internal annular recess 72.

As the cap nut is initially threaded onto the main body, the split ring 60 (and specifically the split ring boss conical-shaped ends 54) rides up slightly on the plastic tubing flared end 36. This is shown in FIG. 11, which is the next-in-sequence from FIG. 10 as the cap nut is screwed onto the fitting main body. In FIG. 11, the cap nut has been initially threaded onto the plastic tubing fitting main body, and the split ring (specifically, the split ring boss conical-shaped ends 54) has ridden up onto the plastic tubing flared end. As can be appreciated, further threading of the cap nut onto the main body causes the split ring 60 (specifically, the split ring bosses 46) to ride along the outer cylindrical surface of the plastic tubing flared end 36 until the split ring bosses align themselves with respective spaced apertures 40 in the plastic tubing flared end, at which time the combination of the resiliency of the split ring and the force of the cap nut internal annular recess second angular annular sidewall 76 acting against the split ring second angular annular side surface 80, causes the split ring bosses 46 to slip down into respective plastic tubing flared end spaced apertures 40. This is shown in FIG. 12, which is the next-in-sequence from FIG. 11 as the cap nut is screwed onto the fitting main body.

Figure 12:
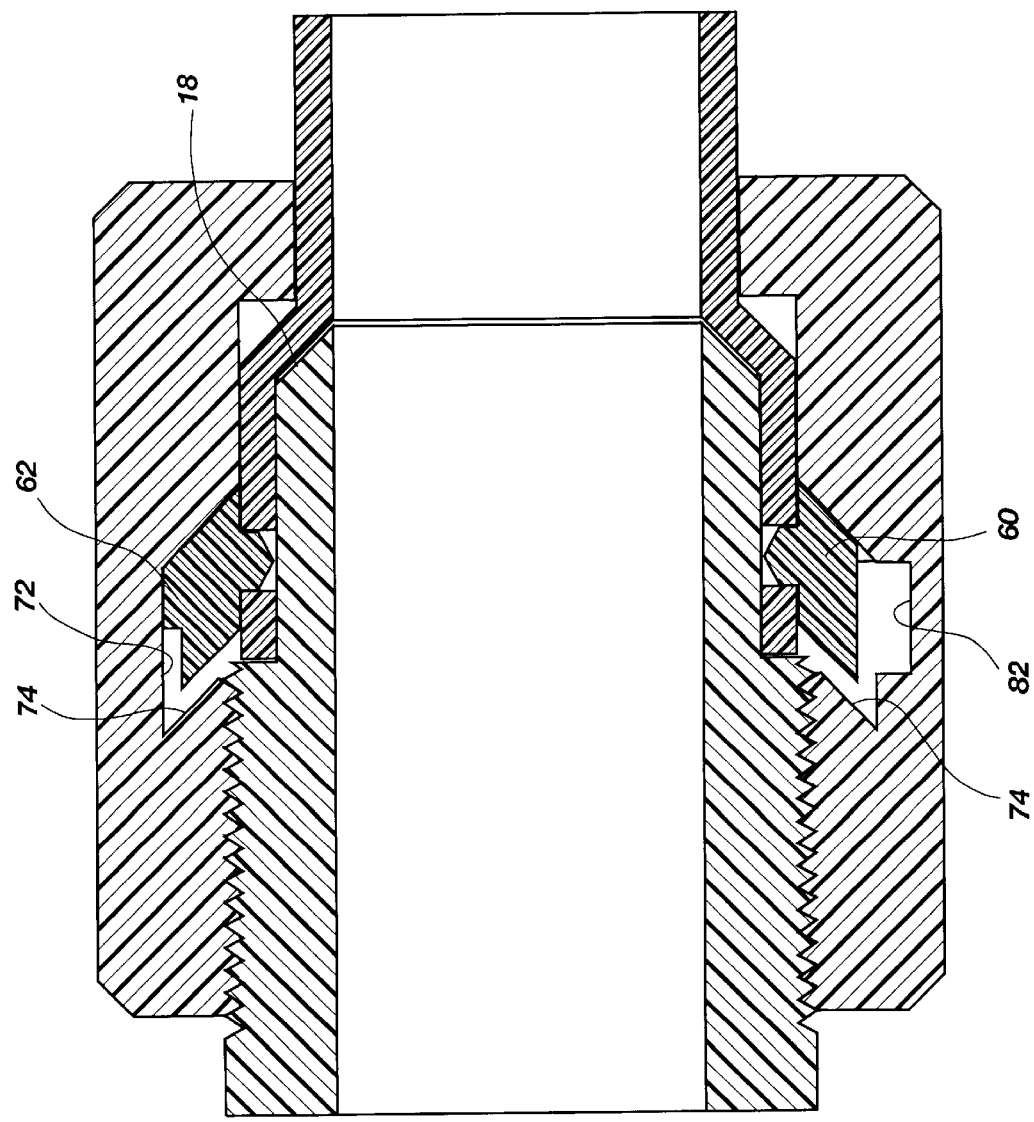
FIG. 12 is a longitudinal sectional view similar to FIG. 11 through the third embodiment plastic tubing fitting, illustrating the positioning of the plastic tubing fitting components with the cap nut completely threaded onto the plastic tubing fitting main body, the split ring bosses having snapped down into respective plastic tubing flared end spaced apertures.

In FIG. 12, the cap nut has been screwed all the way up on the main body externally threaded section to draw the cap nut first bore 66 up into engagement with the plastic tubing at the flare transition to the flared end, to effect the fluid seal between the plastic tubing and the main body tip sleeve. FIG. 5 also illustrates that in this position shown in FIG. 12, the split ring 60 has been cammed down against the plastic tubing flared end by the action of the split ring cam lobes 62 and cap nut annular recess 72.

Figure 13:
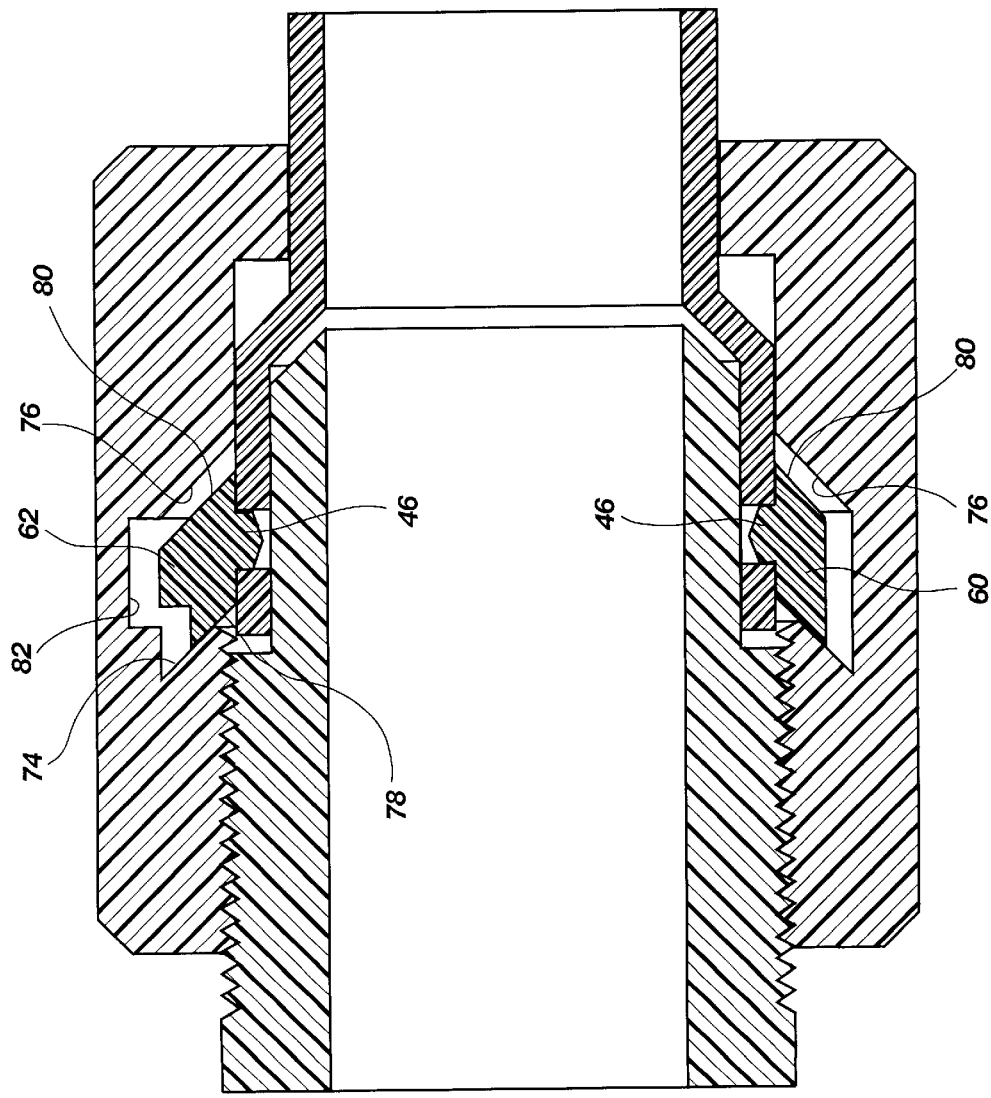
FIG. 13 is a longitudinal sectional view similar to FIG. 12 through the third embodiment plastic tubing fitting, illustrating the positioning of the plastic tubing fitting components as the cap nut is in its initial stage of removal from the plastic tubing fitting main body, the split ring being urged to the right to be removed from the plastic tubing flared end as the cap nut is being backed off from the main body.

FIG. 13 is the next-in-sequence from FIG. 12 as the cap nut is in its initial stage of removal from the plastic tubing fitting main body. As shown, removal (from left to right) of the cap nut 64 causes the cap nut internal annular recess first angular annular side wall 74 to engage the split ring first angular annular side surface 78. This engagement of these two surfaces has a dual effect: (1) Force in the axial direction of the plastic tubing fitting components causes the split ring 60, and therefore, the plastic tubing flared end 36, to be translated to the right in order to disengage the plastic tubing flared end from the main body tip sleeve; and (2) The force normal to the axial-direction force (i.e., the radial force applied by the cap nut annular recess first angular side wall 74 to the split ring first angular side surface 78) causes the split ring to expand in order to disengage the split ring bosses from the plastic tubing flared end spaced apertures. Those skilled in the art will readily appreciate that either or both of these occurrences will permit the cap nut to be removed from the main body, and will either (1) simultaneously remove the plastic tubing flared end, with the split ring intact, from the main body tip sleeve, or (2) remove the holding mechanism (the split ring 60) from the plastic tubing flared end so that the plastic tubing may then be manually removed from the main body tip sleeve.

Figure 14:
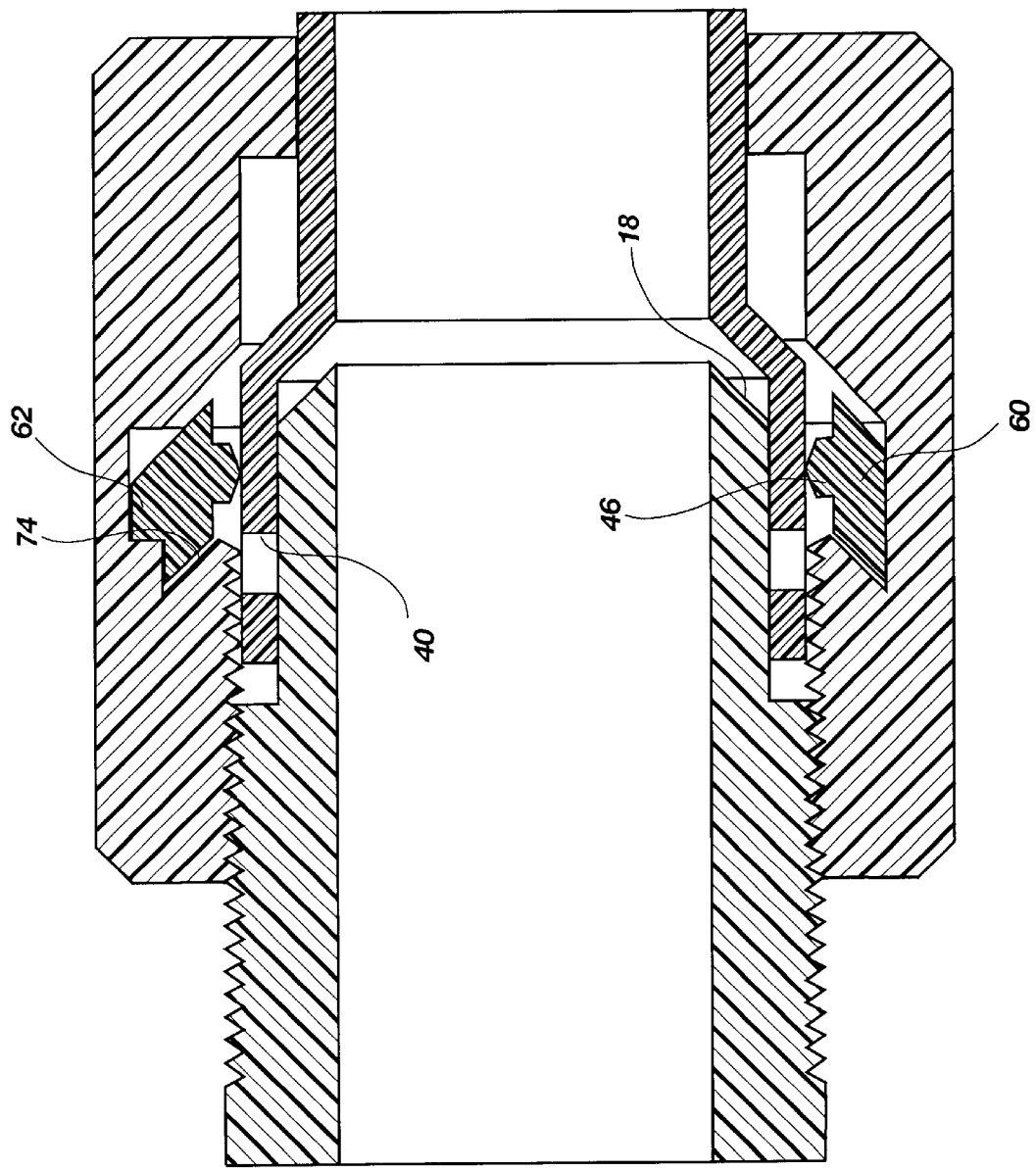
FIG. 14 is a longitudinal sectional view similar to FIG. 13 through the third embodiment plastic tubing fitting, illustrating the positioning of the plastic tubing fitting components as the cap nut is being removed from the plastic tubing fitting main body, the split ring having been expanded outwardly away from the plastic tubing flared end.

This is shown in FIG. 14, which is the next-in-sequence from FIG. 13 as the cap nut is being removed from the fitting main body. In FIG. 14, the split ring 60 has been expanded radially from the plastic tubing flared end, and permitted to slide along the outer circumferential surface of the plastic tubing flared end in order to permit complete removal of the cap nut.

Figure 15:
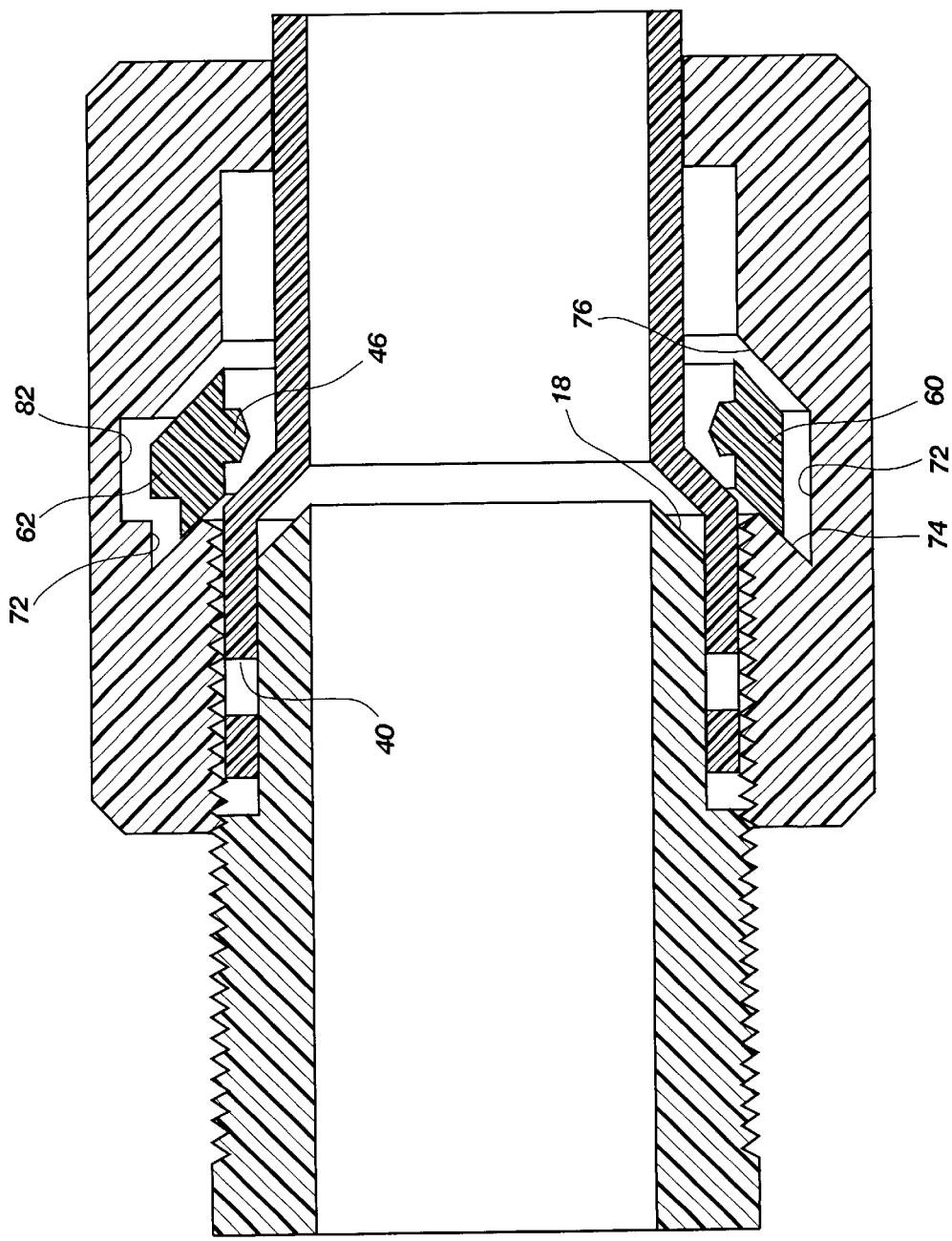
FIG. 15 is a longitudinal sectional view similar to FIG. 14 through the third embodiment plastic tubing fitting, illustrating the positioning of the plastic tubing fitting components as the cap nut is almost completely removed from the plastic tubing fitting main body, the split ring having contracted slightly and dropped below the plastic tubing flared end.

FIG. 15 is the next-in-sequence from FIG. 14 as the cap nut is being removed from the fitting main body, and illustrates that the resiliency of the split ring has caused it to ride down the tapered surface of the plastic tubing flared end, and therefore totally disengage from the plastic tubing, so that the cap nut can be removed from the plastic tubing fitting main body.

From the foregoing it will be seen that this invention is one well adapted to attain all of the ends and objectives herein set forth, together with other advantages which are obvious and which are inherent to the composition and method. It will be understood that certain features and subcombinations are of utility and may be employed with reference to other features and subcombinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense.

REFERENCE NUMERAL LIST

First Embodiment
10 plastic tubing fitting main body
12 main body central fluid passageway
14 main body larger diameter externally threaded section
16 smaller diameter tip sleeve
18 circumferential bevel
20 cap nut
22 cap nut first bore
24 cap nut second bore
26 cap nut internally threaded third bore
28 cap nut internal annular recess
30 split ring
32 split ring split
34 plastic tubing
36 plastic tubing flared end
38 split ring bosses
40 plastic tubing flared end spaced apertures
Second Embodiment
42 split ring
44 cam lobes
46 split ring bosses
48 cap nut internal annular recess detents
50 cap nut internal annular recess
52 cap nut
54 boss conical-shaped ends
Third Embodiment
60 split ring
62 split ring cam lobes
64 cap nut
66 cap nut first bore
68 cap nut second bore
70 cap nut internally threaded third bore
72 cap nut internal annular recess
74 cap nut annular recess first angular annular side wall
76 cap nut annular recess second angular annular side wall
78 split ring first angular annular side surface
80 split ring second angular annular side surface
82 cap nut internal annular recess detents

What is claimed is:

1. In combination,
a plastic tubing having an end, the end having a plurality of spaced apertures therein adjacent the tubing end; and
a plastic fitting for the plastic tubing, the plastic fitting comprising:
a main body having a central fluid passageway therethrough, a tip sleeve with an outer periphery at a first end thereof, and an externally threaded portion at a second end thereof;
a cylindrical cap nut threadedly attachable to the main body, the cap nut having a first bore through a first end thereof, an internally threaded portion at a second end thereof, and an internal annular recess formed between the first bore and the internally threaded portion; and
a resiliently deformable split ring residing in the cap nut internal annular recess, the split ring having a plurality of inwardly facing bosses that fit into and cooperate with the plurality of plastic tubing end spaced apertures to engage the tubing end to retain the tubing end within the cap nut and on the main body tip sleeve.

2. The combination as set forth in claim 1, wherein the plastic tubing end apertures and split ring bosses are circular.

3. The combination as set forth in claim 2, wherein the bosses are the same height as the thickness of the plastic tubing end material.

4. The combination as set forth in claim 3, wherein the height of the bosses is less than the thickness of the plastic tubing end material.

5. The combination as set forth in claim 1, wherein the bosses have flat ends.

6. The combination as set forth in claim 1, wherein the bosses have conical ends.

7. The combination as set forth in claim 1, wherein the bosses have pointed ends.

8. The combination as set forth in claim 1, wherein the cap nut internal annular recess includes a plurality of detents.

9. The combination as set forth in claim 8, wherein the split ring includes a plurality of raised cams sized and oriented to engage respective cap nut internal annular recess detents to permit the split ring to expand from around the plastic tubing end to release the plurality of split ring bosses from respective tubing end spaced apertures, and to be cammed out of respective internal annular recess detents as the cap nut is tightened onto the main body, to force the split ring down against the plastic tubing end to engage the plurality of split ring bosses into respective tubing end spaced apertures to retain the tubing in functional position around the fitting main body tip sleeve.

10. The combination as set forth in claim 1, wherein the cap nut internal annular recess is angled toward the cap nut second end, defining first and second angled sidewalls, and wherein the split ring is formed with angled first and second annular side walls that cooperate with corresponding mating cap nut internal annular recess first and second angled sidewalls in a manner to urge the split ring radially inwardly against the plastic tubing end as the cap nut is tightened to the tip sleeve threaded portion, and to expand the split ring radially outwardly from the plastic tubing end as the cap nut is removed from the tip sleeve threaded portion.

11. A plastic fitting for plastic tubing, the plastic fitting comprising:

a main body having a central fluid passageway therethrough, a tip sleeve with an outer periphery at a first end thereof, and an externally threaded portion at a second end thereof;

a cylindrical cap nut having a first bore through a first end thereof, an internally threaded portion at a second end thereof, and an internal annular recess formed between the first bore and the internally threaded portion, the cap nut internal annular recess including a plurality of detents; and a resiliently deformable split ring residing in the cap nut internal annular recess, the split ring adapted to engage an end of the plastic tubing to retain the plastic tubing end within the cap nut and on the main body tip sleeve, the split ring including a plurality of raised cams sized and oriented to engage respective cap nut internal annular recess detents to permit the split ring to expand from around the plastic tubing end to release the split ring from the tubing end, and to be cammed out of respective internal annular recess detents as the cap nut is tightened onto the main body, to force the split ring down against the plastic tubing end to urge the split ring against the plastic tubing and to retain the plastic tubing end in functional position around the fitting main body tip sleeve.

12. A plastic fitting as set forth in claim 11, wherein the cap nut internal annular recess is angled toward the cap nut second end, defining first and second angled sidewalls, and wherein the split ring is formed with angled first and second annular side walls that cooperate with corresponding mating cap nut internal annular recess first and second angled sidewalls in a manner to urge the split ring radially inwardly against the plastic tubing end as the cap nut is tightened to the tip sleeve threaded portion, and to expand the split ring radially outwardly from the plastic tubing end as the cap nut is removed from the tip sleeve threaded portion.

* * * * *